Feb. 7, 1933.   E. BEYER   1,896,860
CONTROLLING MECHANISM FOR ANIMAL WATERING TROUGHS
Filed July 17, 1930
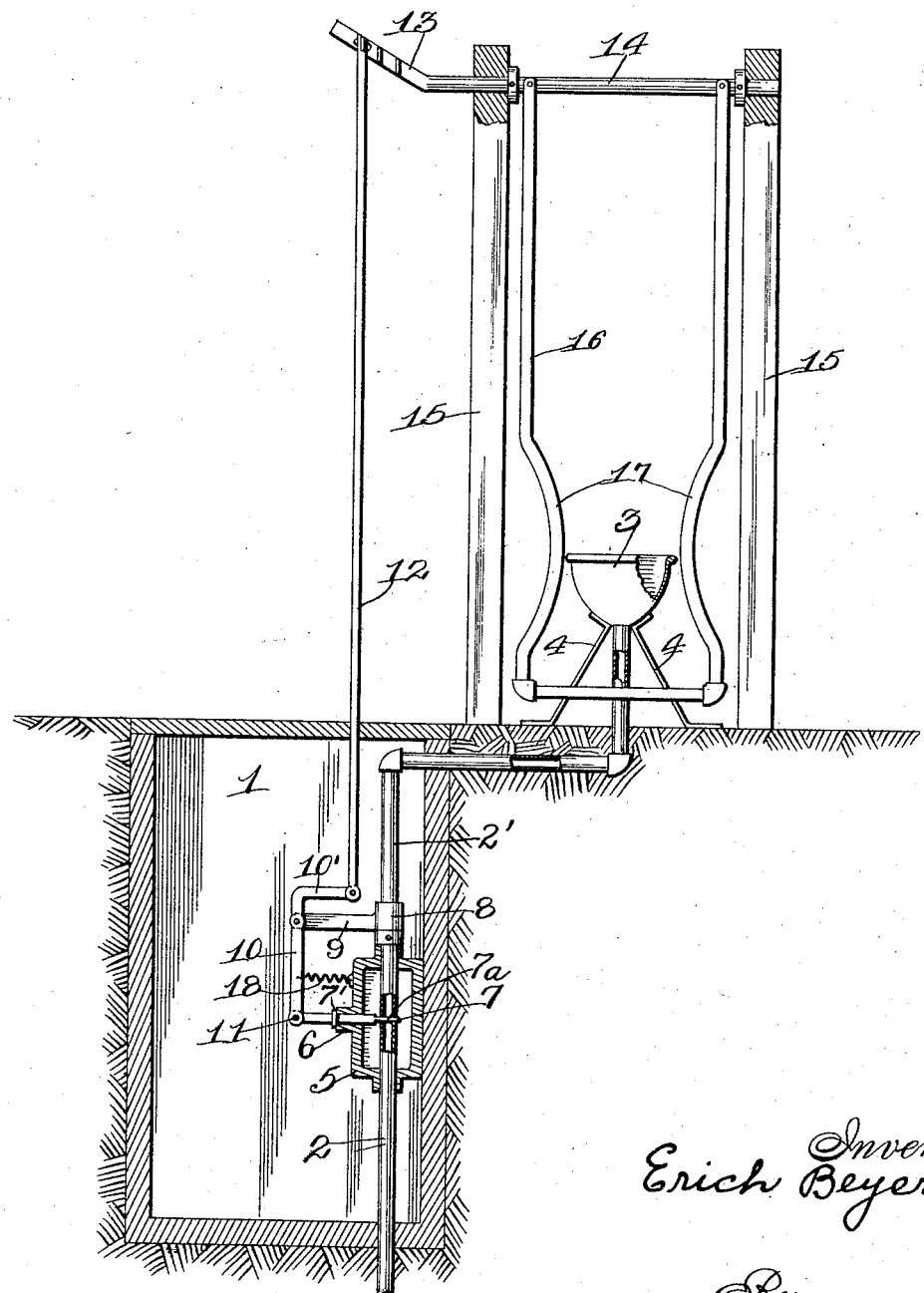
Inventor
Erich Beyer
By Arnold M Ehrlich
Attorney Patented Feb. 7, 1933

1,896,860

UNITED STATES PATENT OFFICE

ERICH BEYER, OF CHICAGO, ILLINOIS

CONTROLLING MECHANISM FOR ANIMAL WATERING TROUGHS

Application filed July 17, 1930. Serial No. 468,652.

This invention relates to new and useful improvements in controlling mechanism.

One of the objects of the present invention is a provision of controlling mechanism adapted to be used in connection with animal watering troughs and so arranged that the mechanism will be actuated by an animal attempting to drink from the trough for opening a supply control valve and admit water to the trough.

Another object of the present invention is the provision of a device of the above character which is adapted to be used for actuating a control valve for the water supply of a watering trough for live stock and is only actuated when the animals are drinking from the trough so that a continuous supply of water may be provided for the trough.

With the above and other objects in view the invention consists in the novel features of construction the combination and arrangement of part hereinafter more fully set forth, pointed out in the claims and shown in the accompanying drawing in which;

The figure represents a side elevation of the invention with parts thereof broken away and illustrated in cross section.

In carrying out my invention I provide a main housing 1 which is buried in the ground as shown in the drawing and leading into this housing is the water supply pipe 2 which passes out of the housing at a point near the top and is then extended upwardly to lead into a watering trough 3 which is supported upon standards 4 above the surface of the ground.

Surrounding the supply pipes 2 and 2' within the housing 1 is a valve housing 5 which has a lateral tubular neck 6 in which is slidably mounted the stem of a valve member 7. Formed on the valve 7, intermediate the ends thereof, is a shoulder 7' which is adapted to abut the outer end of the neck 6 whereby to limit inward movement of the stem. As shown at 7a the stem is flattened a substantially greater length than the diameter of the supply pipes 2 and 2', and is adapted, when the valve is in closed position, to extend between the spaced ends of the pipes 2 and 2'.

A collar 8 is mounted on pipe 2' above the valve housing 5 and extending outwardly therefrom is an arm 9. Pivotally mounted on this arm is a bell crank lever 10 one arm of which is pivotally connected to the outer end of the stem of valve member 7 as shown at 11.

The horizontal arm 10' of the bell crank lever has pivotally connected to its outer end the lower end of an operating rod 12 which is adjustably connected to the angularly disposed end 13 of the rotatable shaft 14 mounted in the upper ends of the spaced uprights 15. These uprights 15 are arranged upon opposite sides of the trough 3. Suspended from the shaft 14 between the uprights 15 is a yoke 16 the opposed sides of which are provided with inwardly bowed portions 17 arranged adjacent and upon opposite sides of the trough 3 so that when an animal approaches the trough for a drink the animal's shoulders will engage the bowed portions 17 and impart a swinging movement to the yoke and rotating shaft 14.

It will be noted that upon rotation of shaft 14 the rod 12 will have a downward movement imparted thereto and rock bell crank 10 for moving valve 7 outwardly, thereby allowing communication between the pipes 2 and 2' so that a supply of water will be conveyed to trough 3. As soon as the animal backs away from the trough the weight of the intermediate portion of the yoke 16 will return the same to its normal inoperative position and a coil spring 18 is connected to housing 5 and the vertical arm of the bell crank for returning the valve 7 to its closed position as shown in the drawing.

It will be apparent that the supply pipe 2 can be connected to a water main under pressure or to a well, and in the latter case any suitable means can be utilized for introducing pressure into the pipe for raising the water to the trough 3. It will be apparent from the foregoing that the device is very useful for the purpose intended as the live stock can always supply fresh water to the trough and there will be very little if any waste to the water.

While I have shown and described the preferred embodiment of the invention it will be apparent that various changes can be made when carrying the invention into practice without departing from the spirit of the invention or the scope of the appended claims.

I claim:

1. In a device of the class described, a drinking receptacle, a supply pipe leading thereto, a valve for controlling the supply of fluid through said trough, a bell crank mounted adjacent said valve and having one end connected thereto, means for retaining said valve in closed position, a movable rod connected to the other end of said bell crank, and a movable yoke adjacent the receptacle having operative connection with said movable rod and adapted to be engaged by an animal nearing the receptacle for moving said valve to an open position against said retaining means.

2. In a device of the class described, a drinking receptacle, a supply pipe leading thereto, a valve for controlling the supply of fluid through said receptacle, a bell crank mounted adjacent said valve and having one end connected thereto, a spring connected to said bell crank for retaining said valve in a closed position, a reciprocable rod connected to the other end of said bell crank, a rotatable shaft above said receptacle having a laterally offset end connected to said rod, and a yoke connected to said shaft and arranged adjacent said receptacle and adapted to be actuated by an animal approaching said receptacle for opening said valve.

In witness whereof I have hereunto set my hand the 15th day of July, A. D. 1930.

ERICH BEYER.